US009902596B2

(12) United States Patent
Morrow et al.

(10) Patent No.: US 9,902,596 B2
(45) Date of Patent: Feb. 27, 2018

(54) SYSTEM AND METHOD TO DETERMINE RELATIVE VELOCITY OF CRANE AND TARGET LOAD

(71) Applicant: Seatrax, Inc., Houston, TX (US)

(72) Inventors: William D. Morrow, Houston, TX (US); Max D. Supkis, Houston, TX (US); Stephen G. Zabrecky, Houston, TX (US)

(73) Assignee: Seatrax, Inc., Houston, TX (US)

( * ) Notice: Subject to any disclaimer, the term of this patent is extended or adjusted under 35 U.S.C. 154(b) by 660 days.

(21) Appl. No.: 14/398,527

(22) PCT Filed: May 31, 2013

(86) PCT No.: PCT/US2013/043746
§ 371 (c)(1),
(2) Date: Nov. 3, 2014

(87) PCT Pub. No.: WO2013/181621
PCT Pub. Date: Dec. 5, 2013

(65) Prior Publication Data
US 2015/0112638 A1    Apr. 23, 2015

Related U.S. Application Data

(60) Provisional application No. 61/654,692, filed on Jun. 1, 2012.

(51) Int. Cl.
*G06F 11/30* (2006.01)
*G21C 17/00* (2006.01)
(Continued)

(52) U.S. Cl.
CPC ............. *B66C 13/46* (2013.01); *B66C 13/02* (2013.01); *G01M 99/005* (2013.01); *G01S 17/74* (2013.01); *B63B 27/10* (2013.01); *G01S 19/51* (2013.01)

(58) Field of Classification Search
USPC ........................................................ 702/182
See application file for complete search history.

(56) References Cited

U.S. PATENT DOCUMENTS 4,147,330 A * 4/1979 Eik .................... B66C 13/02
254/266
4,354,608 A   10/1982 Wudtke
(Continued)

FOREIGN PATENT DOCUMENTS

DE      2536694 A1    3/1976
DE      2818569 A1    10/1979
(Continued)

OTHER PUBLICATIONS

Extended European Search Report and Search Opinion, dated Dec. 10, 2015.
(Continued)

*Primary Examiner* — Gregory J Toatley
*Assistant Examiner* — Terence Stifter, Jr.
(74) *Attorney, Agent, or Firm* — Keeling Law, LLC; Kenneth A. Keeling; Mark S. Solomon

(57) ABSTRACT

A system and method are provided that allow for direct measurement of relative movement and relative velocity of movement of a crane (10) boom tip (14) in relation to a target load (24) on an adjacent vessel deck (20) allowing real-time determination of work load parameters under then-current conditions. A rangefinder (32) is located proximate boom tip (14) without requirement of a device on the target load or load vessel. A method accumulates relative movement, environmental data and as-built crane design to determine rated capacity of crane (10).

14 Claims, 7 Drawing Sheets

(51) Int. Cl.
  *B66C 13/46* (2006.01)
  *G01S 17/74* (2006.01)
  *B66C 13/02* (2006.01)
  *B63B 27/10* (2006.01)
  *G01M 99/00* (2011.01)
  *G01S 19/51* (2010.01)

(56) References Cited

U.S. PATENT DOCUMENTS

| | | | |
|---|---|---|---|
| 4,752,012 A | 6/1988 | Juergens | |
| 4,753,357 A | 6/1988 | Miyoshi et al. | |
| 4,932,541 A | 6/1990 | Belsterling | |
| 5,491,549 A * | 2/1996 | Wichner | B66C 13/063 212/275 |
| 5,785,191 A | 7/1998 | Feddema et al. | |
| 6,028,432 A * | 2/2000 | Doemens | B66C 13/063 324/642 |
| 6,826,452 B1 | 11/2004 | Holland et al. | |
| 6,836,707 B2 | 12/2004 | Sowada et al. | |
| 7,411,545 B2 | 8/2008 | Dutton | |
| 7,474,962 B2 | 1/2009 | Waid et al. | |
| 7,798,471 B2 | 9/2010 | Christopher | |
| 8,179,741 B2 | 5/2012 | Bornsen | |
| 8,265,811 B2 | 9/2012 | Kyllingstad | |
| 2005/0072965 A1 | 4/2005 | Sanders et al. | |
| 2005/0232626 A1 | 10/2005 | Schulte et al. | |
| 2007/0027613 A1 * | 2/2007 | Abel | B66C 23/905 701/124 |
| 2007/0289931 A1 * | 12/2007 | Henriksson | B66C 13/063 212/274 |
| 2008/0304042 A1 | 12/2008 | Ueno | |
| 2011/0066394 A1 * | 3/2011 | Schneider | B66C 13/16 702/101 |
| 2011/0076130 A1 * | 3/2011 | Stocker | B66C 13/46 414/815 |
| 2012/0092643 A1 | 4/2012 | Rintanen et al. | |
| 2012/0296519 A1 * | 11/2012 | Eberharter | B63B 27/10 701/34.4 |
| 2013/0120577 A1 * | 5/2013 | Austefjord | B66C 13/02 348/148 |
| 2013/0345857 A1 * | 12/2013 | Lee | G01S 5/16 700/229 |
| 2014/0107971 A1 * | 4/2014 | Engedal | B66C 13/02 702/150 |

FOREIGN PATENT DOCUMENTS

| | | |
|---|---|---|
| DE | 4440389 A1 | 5/1996 |
| EP | 0420625 A2 | 4/1991 |
| GB | 1567534 A1 | 5/1980 |
| KR | 10-2011-0066764 A1 | 6/2011 |
| WO | 2011/135310 A2 | 11/2011 |

OTHER PUBLICATIONS

Singapore Search Report and Written Opinion, dated Feb. 19, 2016.
Singapore Written Opinion, dated Sep. 1, 2016.
Australian Patent Examination Report No. 1, dated Sep. 9, 2016.
Singapore Written Opinion, dated Nov. 1, 2016.

* cited by examiner

SYSTEM AND METHOD TO DETERMINE RELATIVE VELOCITY OF CRANE AND TARGET LOAD

CROSS-REFERENCE TO RELATED APPLICATIONS

This application claims the benefit and priority of co-pending PCT Application No. PCT/US2013/043746, filed May 31, 2013, titled "System and Method to Determine Relative Velocity of Crane and Target Load," which claims the benefit and priority of then Provisional Application No. U.S. 61/654,692, filed in the United States Patent and Trademark Office on Jun. 1, 2013, titled "Crane Capacity Direct Measurement and Calculation Apparatus and Method," both of which applications are included by reference herein as if reproduced in full below.

STATEMENT REGARDING FEDERALLY SPONSORED RESEARCH OR DEVELOPMENT

Not Applicable.

BACKGROUND OF THE INVENTION

Field of the Invention

The present invention relates generally to a system and method for determining distance and velocity in relation to the crane boom tip of a target load to be lifted by a crane in an offshore environment. More particularly, the present invention is directed to a system and method for determining distance and velocity of a target load of an offshore crane in an offshore environment wherein the target load and the crane are each subject to heave from waves and other environmental conditions and to determination of a rated capacity of a crane in specific environments.

Description of the Related Art

Offshore cranes are commonly used in the oil and gas and commercial industries. Historically, crane manufacturers develop and publish crane rating charts to indicate crane safe lifting limits based on as-built crane design. Crane safe working limit load charts typically express crane safe lifting limits as a function of boom orientation. Load charts are specific to the as-built crane design. Load charts are generated from multiple iterations of calculations based on as-built crane design with variations in boom orientation.

In application, crane lifting capacity is affected by, among other things, distance of the target load from the crane, list and trim of the crane relative to vertical, orientation of the crane boom in relation to the load and boom angle. Environmental factors, such as wind speed, affect safe lifting capacity. In an offshore environment, additional environmental conditions include movement of both the crane and the target load as a result of wind, waves and current. A significant offshore environmental factor is the up and down motion of vessels ("heave") from wave action. Waves, wind and current additionally cause lateral movement. As waves, wind and current differentially affect vessels of differing sizes and configurations, relative vertical and lateral movement of a load vessel in relation to a crane vessel occurs.

To safely lift loads, adjustments to crane capacity are necessary to account for site specific conditions, including relative movement of the load in relation to the crane. As use herein, "rated capacity" is used to mean a load that is allowed to be used under specific environmental conditions and specific positioning of the crane hook at the time of the lift.

The American Petroleum Institute ("API") promulgates guidelines relating to rated capacity of cranes in an offshore environment. A current guideline utilizes "Significant Wave Height" as an indicator of relative movement of the target load in relation to the crane boom tip in calculation of a crane's rated capacity. The API Significant Wave Height standard is the mean wave height of the highest one-third of the waves. A high Significant Wave Height results in relative lower load capacity.

Wave height may be measured by appropriate instruments, but is typically estimated from visual observation. Historically, the crane operator selects an appropriate load rating chart as a factor in determining a crane's load capacity according to applicable standards based on observed estimated wave height and subsequent determination of Significant Wave Height.

While Significant Wave Height is an indicator of potential movement of target loads, it is of limited value in indicating relative movement of the target load in relation to the boom tip, and in indicating relative velocity of movement of the target load in relation to the boom tip. Due to the many variables involved and limitations of the method, calculation of rated capacity based on Significant Wave Height must involve a highly conservative estimate. Otherwise, offshore cranes are often not utilized at an otherwise appropriate lifting capacity.

An offboard lift is a lift from a separate vessel (as opposed to an onboard lift wherein the crane and load are on the same vessel). A significant consideration in an offboard lift is relative movement of the load-containing vessel and the vessel on which the crane is mounted. It is particularly important that the lifted load not be subject to impact resulting from vessel heave or other movement after initiation of the lift. Accordingly, crane hook lift speed must be sufficient to prevent inadvertent contact of the lifted object with vessel structures after initiation of the lifting operation. API guidelines rely on estimated or calculated wave height and resulting calculated Significant Wave Height as a standard to determine needed hook speed. Lower hook speed increases with increased Significant Wave Height. Due to the many variables involved and limitations of the underlying method, the determination must be a highly conservative estimate as the underlying method does not determine velocity of the target load in relation to the crane boom tip.

Other conditions affect rated capacity of cranes used offshore, including list and trim of the crane in relation to vertical, wind speed, boom angle and consequent crane hook radius, and crane hook load.

In current practice, the crane operator determines, by measurement, estimation or a combination thereof the Significant Wave Height, crane list and trim, wind speed, boom angle and crane hook load. The crane operator then consults manufacturer load charts to determine a rated load capacity and lower crane hook speed for the crane.

In applications not subject to API guidelines, the underlying problem and uncertainties of determination of safe crane lift load and required crane hook speed based on assumed environmental conditions remains.

While it is prudent and necessary to limit loads to rated capacities and to determine required hook speed based on environmental factors, current practice results in underutilization of crane load capacities and overly conservative determinations of required crane hook speed.

BRIEF SUMMARY OF THE INVENTION

A system and method are provided that allow for direct measurement of relative vertical movement and relative velocity of movement of a target load placed on an adjacent vessel deck and a crane boom tip allowing real-time determination of work load parameters under then-current conditions.

An exemplary system comprises a rangefinder provided proximate the crane boom tip without requirement of a device on the target load or load vessel. The system and method allows determination of target load movement relative the crane and determination of applicable crane load parameters solely from a system mounted on the crane. In an exemplary embodiment, the system includes a laser transmitter to transmit a pulsed laser beam toward a target surface of the adjacent vessel, a photodiode sensor and signal processor.

Accumulated data allows determination of target load movement parameters including extent of movement and velocity of movement of the target load in relation to the crane boom tip.

A method of the present invention accumulates environmental information and as-built crane design to determine rated capacity independent of crane manufacturer load charts.

DESCRIPTION OF THE INVENTION

Figure 1:
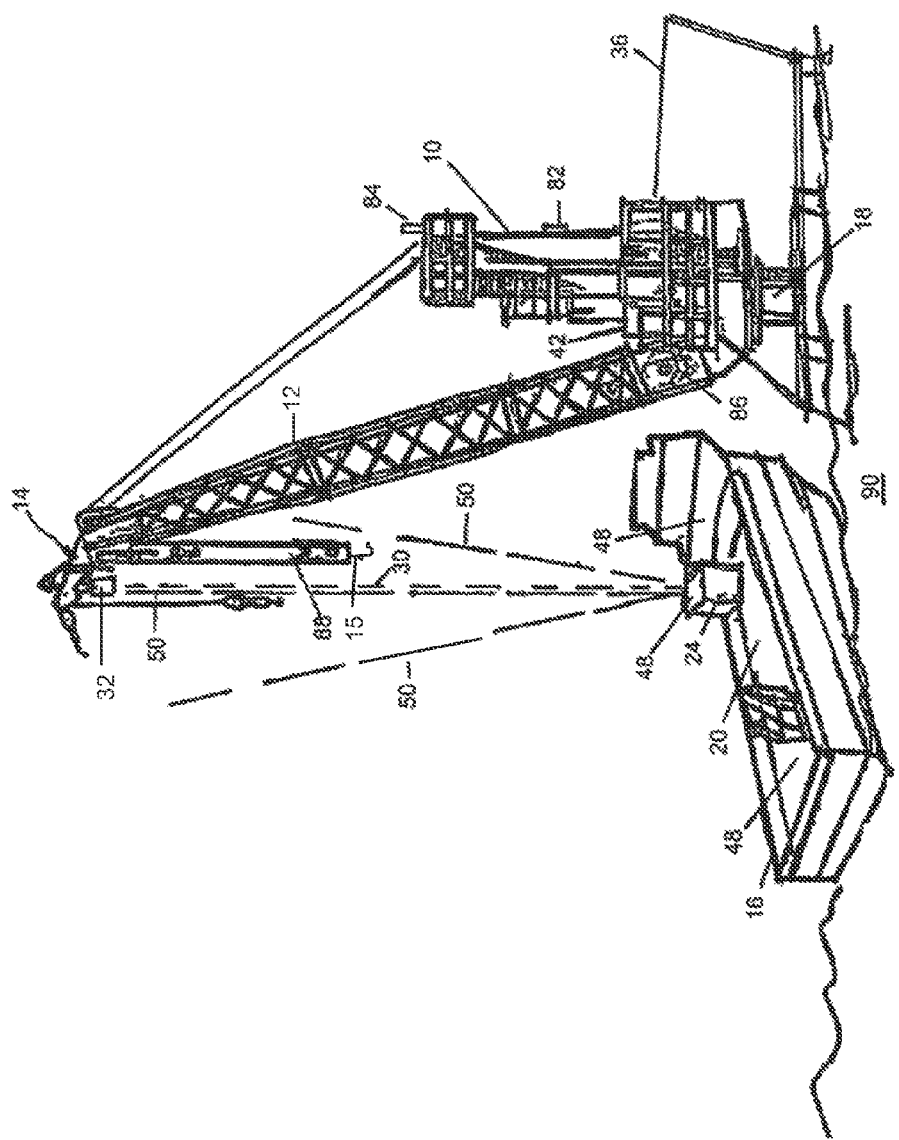
FIG. 1 depicts a perspective view of a crane and adjacent boat.

Exemplary embodiments are best understood by referring to the drawings, like numerals being used for like and corresponding parts of the various drawings.

Referring first to FIG. 1, an offshore crane 10 is depicted with an adjacent vessel 16 carrying a target load 24. Crane 10 includes, among other things, an operator cab 42, a boom 12 and a boom tip 14. Crane 10 is mounted on a pedestal 18 on a structure such as an offshore rig 36.

At least one rangefinder 32 is provided on crane boom 12. In an exemplary embodiment, rangefinder 32 is mounted proximate boom tip 14. Rangefinder 32 includes a transmitter (not shown), a photodiode (not shown), and a signal processor 34 (not shown). Rangefinder 32 is positioned and oriented to determine distance 70 of a target load 24 from rangefinder 32. As rangefinder 32 is proximate boom tip 14, distance 70 is also a measure of distance from target load 24 to boom tip 14.

In an offshore environment distance 70 varies due to vessel 16 heave and rig 36 heave as a function of wave action. Upon multiple distance 70 determinations over time, upper and lower levels of distance 70 may be determined as well as velocity of change of distance 70 as a result of heave of vessel 16 and rig 36.

In an exemplary embodiment, rangefinder 32 comprises a pulsed rangefinder that measures distance using a laser beam, a photodiode and a microprocessor. The rangefinder works based on time of flight measurement by emitting high-frequency pulsed laser light which is diffusely reflected back from the target 24. The return signal is compared with a reference clock. From the amount of time, a resulting distance may be accurately measured. Multiple samples may be taken in a relatively short period, thereby providing data to calculate velocity of target movement. An exemplary system is identified as a model Acuity AR 3000 manufactured by Schmitt Industries, Inc.

In other exemplary embodiments, the rangefinder 32 may utilize a laser Doppler velocimeter, a photonic Doppler velocimeter, an optical distance measuring-system and ultrasonic distance-measuring devices.

In the exemplary embodiment depicted rangefinder 32 is oriented such that beam 30 is directed vertically downward from rangefinder 32 toward target load 24. Such positioning allows for direct measurement on a real-time basis of the distance 70, and more importantly of variations of distance 70 over time thereby providing real-time determination of distance 70 from boom tip 14 to target load 24 and, importantly, real-time determination of velocity of movement of upper and lower limits of movement of target load 24 in relation to boom tip 14 and relative velocity of movement of target load 24 in relation to boom tip 14. As used herein relative vertical velocity describes the relative velocity of movement in a vertical direction of the target load 24 in relation to boom tip 14, a function of distance 70 measurements over time.

In an exemplary embodiment, rangefinder 32 is attached to boom tip 14 by a pendulum 10x, thereby orienting beam 30 downward. Other attachment means may be utilized.

Figure 2:
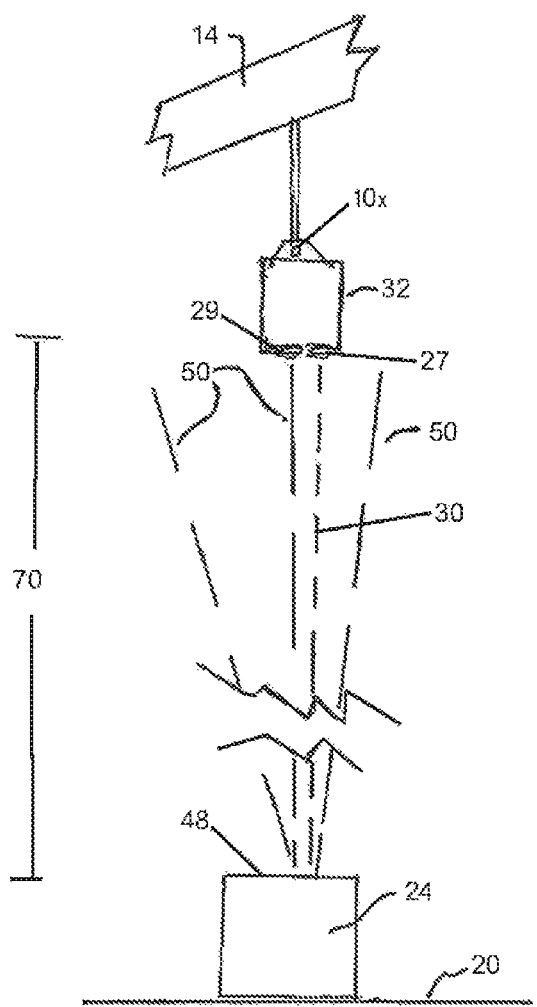
FIG. 2 depicts an exemplary rangefinder.

Referring to FIG. 2, an embodiment of a rangefinder 32 comprises a laser transmitter (not shown) for transmission of a signal through lens 27, a photodiode (not shown) for receiving refracted signals through lens 29, and a signal processor 34 (not shown) within a housing (not shown). Transmitter 26 emits high frequency pulsed laser light, referred to herein as beam 30 through lens 27. Beam 30 is refracted and partially reflected from surface 48 thereby producing refracted beam 50. As used herein, the term "refracted" includes the term "reflected." A reference clock (not shown) determines time of travel of beam 30 and beam 50. As used herein, surface 48, unless specified otherwise, may refer to multiple surfaces encountered by beam 30, including a surface of a target load 24, a deck 20 surface, or other surfaces encountered. Refracted beam 30 is identified as beam 50. Refracted beams 50 are also exemplarily depicted in FIG. 1.

Photodiode 28 senses a portion of refracted beam 50 and transmits resulting input to signal processor 34 (not shown). Signal processor 34 (not shown) accumulates data received and calculates travel time of beam 30 and beam 50, and, from travel time, distance 70 of selected surface 48. Commercially-available rangefinders 32 are capable of calculating distance measurements thousands of times per second and thereby generating real-time distance 70 and velocity measurement.

Crane 10 has an onboard data processor 44 (not shown) pre-loaded with software 200 (not shown). Rangefinder 32 distance 70 and velocity data is transmitted to data processor 44. Data processor 44 accumulates distance 70 and velocity data to determine real-time distance 70 differentials to determine heave effects in relation to crane capacity and to determine velocity of relative movement of crane tip 14 and target load 24. Specifically, by determining upper and lower values of distance 70, a relative distance 70 range of boom tip 14 to target load 24 may be determined. Relative distance 70 range indicates actual distance 70 variation, a determination of relative vertical motion due to effect of waves on vessel 16 and rig 36.

Data processor 44 accumulates distance 70 data during determined time increments to calculate vertical velocity of relative movement of load 24 with boom tip 14 to determine necessary crane hook 15 velocity to prevent re-contact of target load 24 with vessel 16 and equipment and structures located on vessel 16 after initiation of a lifting operation.

During crane 10 operations, boom tip 14 is regularly moved, thereby being directed to open water 90 and various surfaces 48 defined by equipment and structures (not shown). Accordingly, beam 30 may be directed to open water 90. When crane boom tip 14 is not moving, beam 30 may be directed to various surfaces 48 due to relative movement of vessel 16 in relation to rig 36. Accordingly, beam 30 is not continuously oriented directly on target load 24. Generally, target load 24 is relatively small in comparison with the multiple surfaces such as other target loads, deck 20, and other structures of a seagoing vessel such as vessel 16.

As beam 30 is oriented toward various surfaces, abrupt variations of distance 70 measurement occur. Such abrupt changes are reflected in distance 70 measurements and in velocity measurements and are referred to herein as "outliers." Outlier distance 70 measurements are filtered by accumulating distance 70 measurements over time and determining average distance ranges. Deviations of a determined amount from distance ranges are identified as outliers and accumulated over a determined time frame. If multiple outliers are identified within a determined time period, such outliers are included in average distance range determinations. If less than a determined number of outliers are identified within a determined time period, the outliers are excluded from distance 70 measurements and excluded from the distance range.

In an exemplary embodiment, velocity measurements are filtered as velocity measurements are subject to distortion due to abrupt variations of distance 70 measurements. Outlier velocity measurements are filtered by accumulating velocity measurements over time and determining average velocity. Deviations of a determined amount from average velocity are identified as outliers and are accumulated over a determined time frame. If multiple outliers are identified within a determined time period, such outliers are included in average velocity determinations. If less than a determined number of outliers are identified within a determined time period, the outliers are excluded from velocity measurements.

In the exemplary embodiment of the present invention, filtering distance 70 and velocity outliers is accomplished by software 200 of data processor 44.

In accordance with the filtering method, if movement of the boom tip 14 causes beam 30 to move from a surface 48 of load 24 to, for example, a surface 48 of vessel deck 20, the apparent spike in distance 70 and velocity will be filtered out of the data for determination of distance range 74 and velocity.

Refraction of beam 30 from water 90 differs substantially from refraction of beam 30 from a solid surface 48 due to limited refraction of beam 30 from water 90. Limited refraction occurrences associated with direction of beam 30 to water 90 are filtered from accumulated data through data processor 44 and software 200.

Distance 70 and velocity data output from signal processor 34 (not shown) may be concurrently output to a user interface for review by an operator (not shown) located in operator cab 42. In an application involving published load charts, the operator may use such actual measurements of relative vertical velocity, as well as other factors including upper and lower distances 70, to determine applicable crane rated capacity from crane load charts.

In an application wherein as-built crane design criteria are available and incorporated into software 200, as-built crane design, measured velocity and other known environmental conditions may be utilized to calculate rated capacity utilizing data processor 44.

A recording device 46 or data processor 44 internal storage device (not shown) may be used to record data and real time computations completed by data processor 44 into an electronic data log for later reference.

Figure 3:
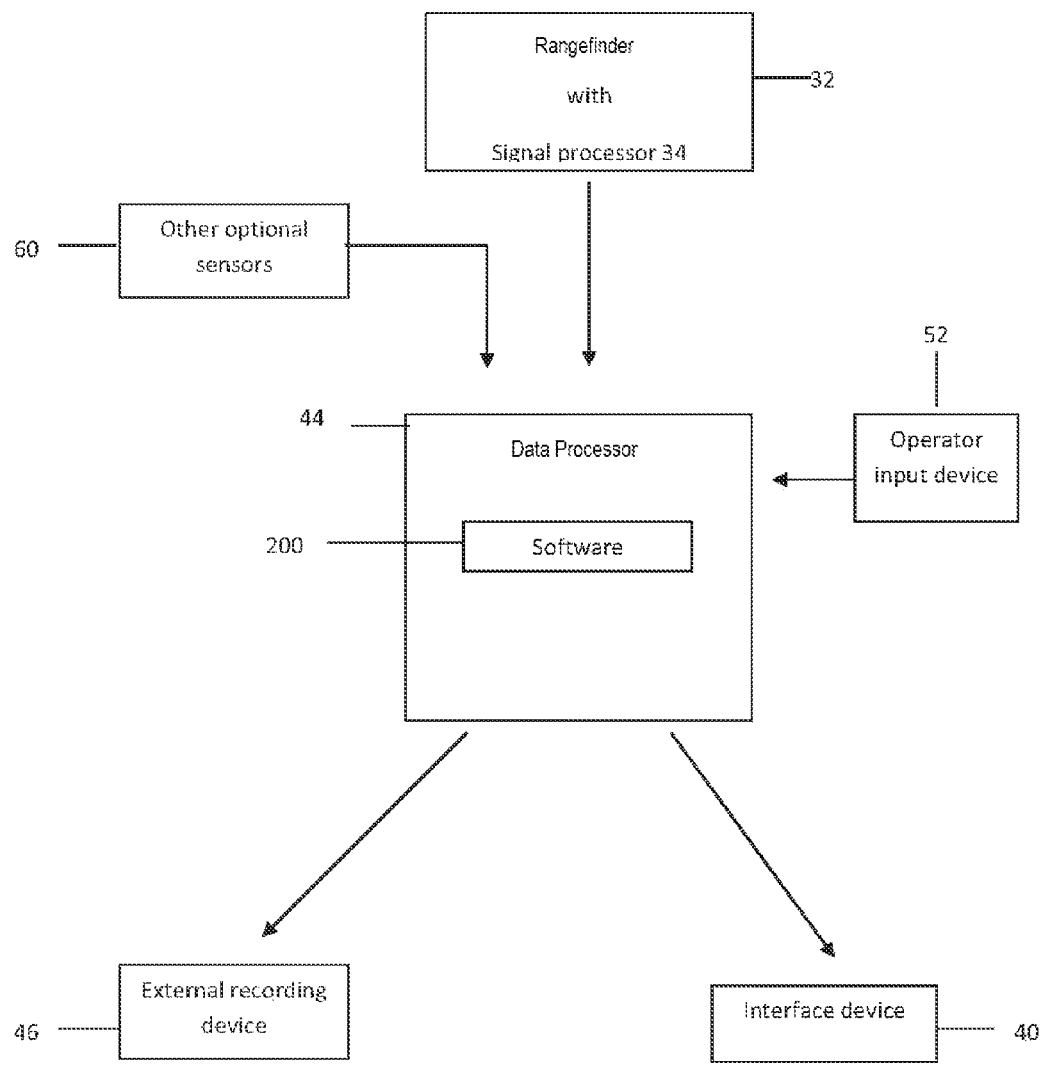
FIG. 3 depicts a schematic diagram of a system of the present invention.

FIG. 3 depicts a schematic layout of an embodiment of the present invention. Referring to FIG. 3, rangefinder 32 with signal processor 34 is electrically connected with data processor 44 to allow transmission of gathered data to data processor 44. An operator input device 52 allows for manual input of parameters by an operator and operational control of data processor 44. As depicted in FIG. 3, crane 10 may be equipped with other sensors 60 to sense various other parameters.

Figure 4:
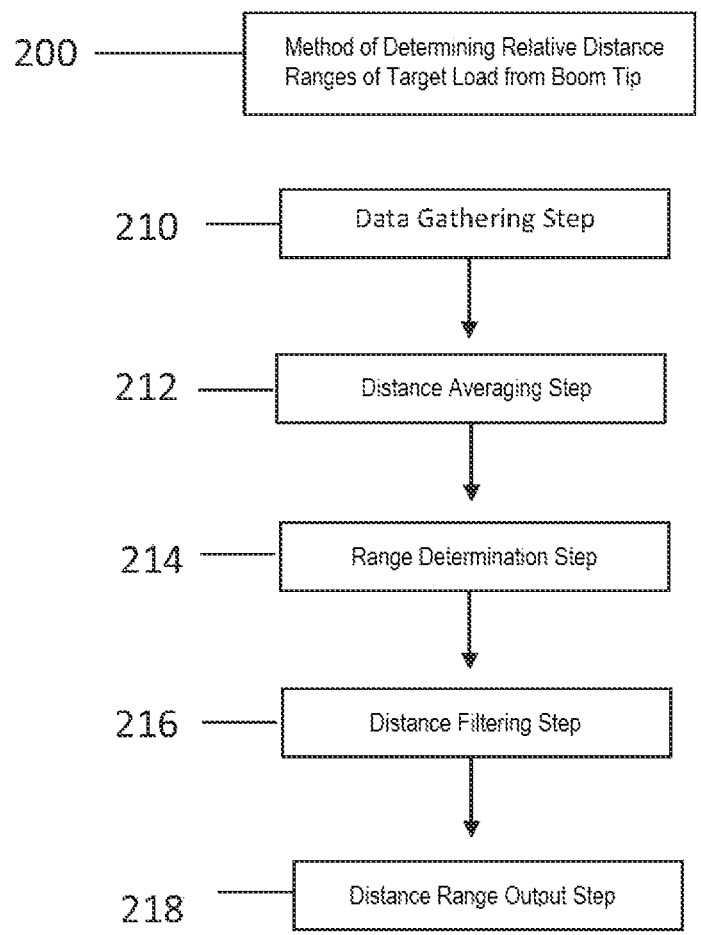
FIG. 4 depicts an exemplary distance determination method of the present invention.

Referring to FIG. 4, an exemplary method 200 of determination of relative distance ranges of a crane boom tip 14 to a target load based on then-current conditions comprises the following steps:

Data Gathering Step 210 comprises a step of transmitting pulsed laser beam 30 vertically downward from rangefinder 32 to surface 48 proximate target load 24 and sensing refracted laser beam 50.

Distance Averaging Step 212 determines average distance 70 measurements during specified time intervals and transmits distance 70 measurements from signal processor 34 to data processor 44.

Range Determination Step 214 determines average upper distance 70 measurements and average lower distance 70 distance measurements.

Distance Filtering Step 216 filters outlier maximum distance 70 measurements and outlier minimum distance 70 measurements resulting in normalized average maximum distance 70 measurements and average minimum 70 vertical distance measurements.

Distance Range Output Step 218 provides output of vertical distance range, such range comprising the differential vertical movement of target load 24 in relation to boom tip 14.

Figure 5:
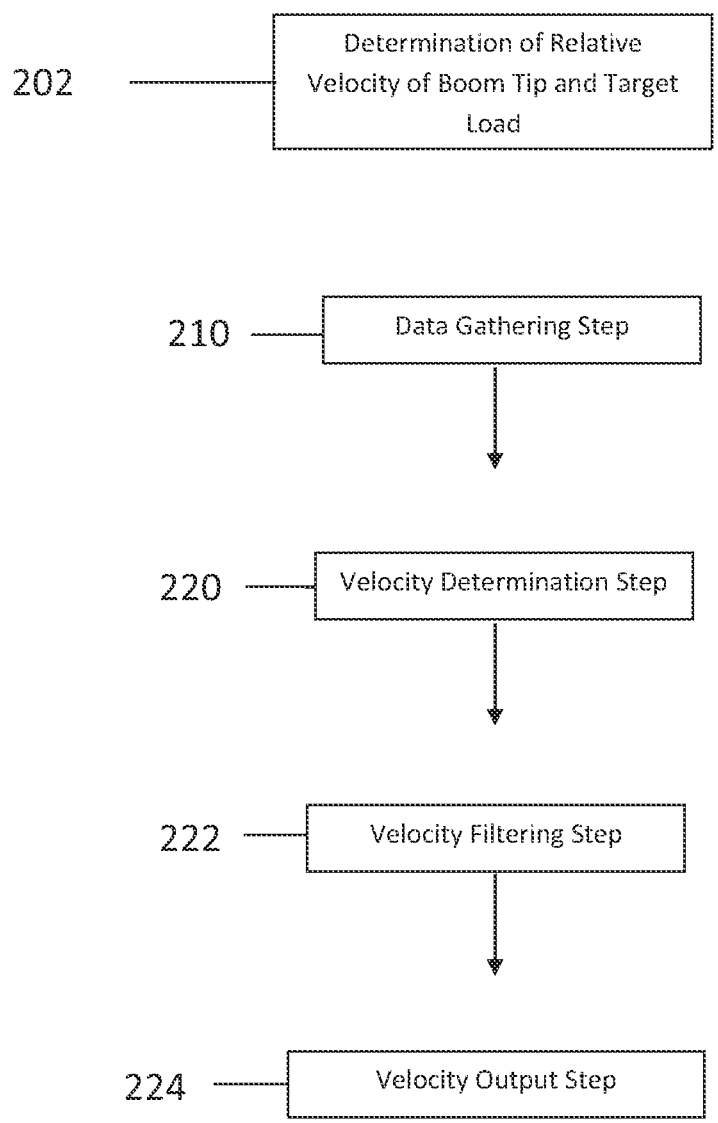
FIG. 5 depicts an exemplary velocity determination method of the present invention.

Referring to FIG. 5, an exemplary method 202 of determination of relative velocity of a crane boom tip 14 in relation to a target load 24 based on then-current conditions comprises the following steps:

Data Gathering Step 210 comprises a step of transmitting pulsed laser beam 30 vertically downward from rangefinder 32 to surface 48 proximate target load 24 and sensing refracted laser beam 50.

Velocity Determination Step 220 determines velocity of movement of boom tip 14 in relation to target load 24 from distance 70 measurements during specified time intervals and transmitting velocity measurements from signal processor 34 to data processor 44.

Velocity Filtering Step 222 filters outlier velocity measurements during a specified period of time from average vertical velocity measurements during a specified period of time resulting in normalized average velocity measurements during a specified period of time.

Velocity Output Step 224 provides output of relative velocity of target load 24 in relation to boom tip 14.

Operation

In operation, once an adjacent vessel 16 is in range, crane 10 is positioned over load 24 such that mounted rangefinder 32 is directed towards a surface 48 proximate target 24. Surface 48 may be a surface of target load 24, loading deck 20 or other surface of the adjacent vessel 16. Beam 50 is refracted from surface 48. A portion of beam 50 is received by photodiode 28.

Signal processor 34 accumulates distance 70 data over time, processes the data and transmits relative distance data 70 and relative vertical velocity data electronically to a data processor 44 in operator cab 42. Data processor 44 filters distance 70 data to determine relative vertical distance range of load 24 in relation to boom tip 14. Data processor 44 filters velocity data to determine relative vertical velocity of load 24 in relation to boom tip 14.

As depicted in FIG. 3, data from rangefinder 32 and other sensors 60 may be electronically transmitted to data processor 44. Data processor 44, with associated software 200, determines rated capacity of the offshore crane 10 utilizing the real-time direct measurements.

Second Exemplary Embodiment

In an exemplary embodiment of the present invention, rated capacity of an offshore crane is computed utilizing as-built crane parameters and then-existing environmental conditions.

Figure 6:
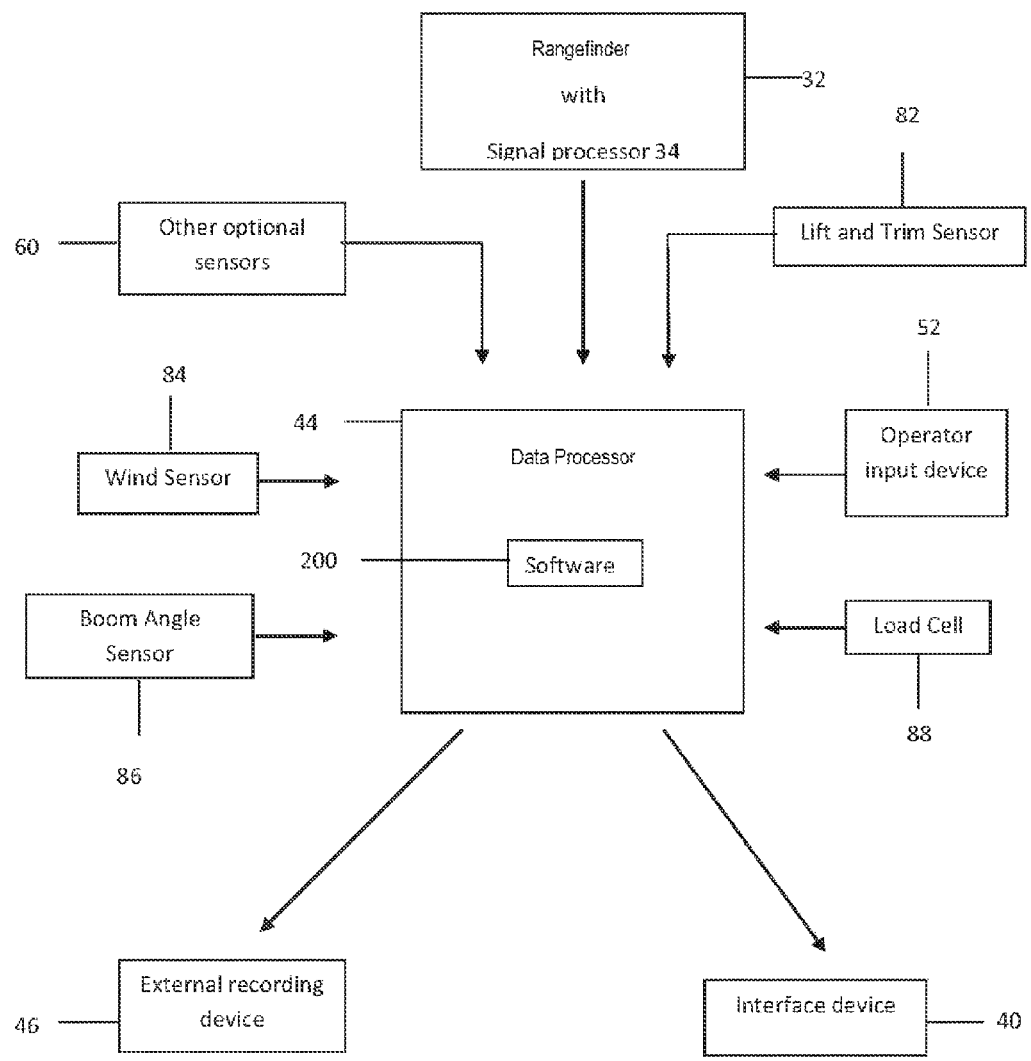
FIG. 6 depicts a schematic diagram of an alternative system of the present invention.

Referring to FIGS. 1 and 6, a lift and trim sensor 82 is provided on crane 10 to measure and output to data processor 44 lift and trim of crane 10. Lift and trim sensors are known in the art and are commercially available.

A wind sensor 84 is provided on crane 10 to measure environmental wind conditions and output to data processor 44 environmental wind conditions. Wind sensors are known in the art and are commercially available.

A boom angle sensor 86 is provided on crane 10 to measure the angle of boom 12 relative to vertical and output to data processor 44 boom angle status. Boom angle sensors are known in the art and are commercially available.

A load cell 88 load sensor is provided on crane hook 15 to determine actual loads encountered by crane hook 15. Load cells are known in the art and are commercially available. Load cell 88 is not utilized to determine rated capacity of the crane, but is instead used as a comparator of actual load on load hook 15 in relation to rated capacity determinations.

Figure 7:
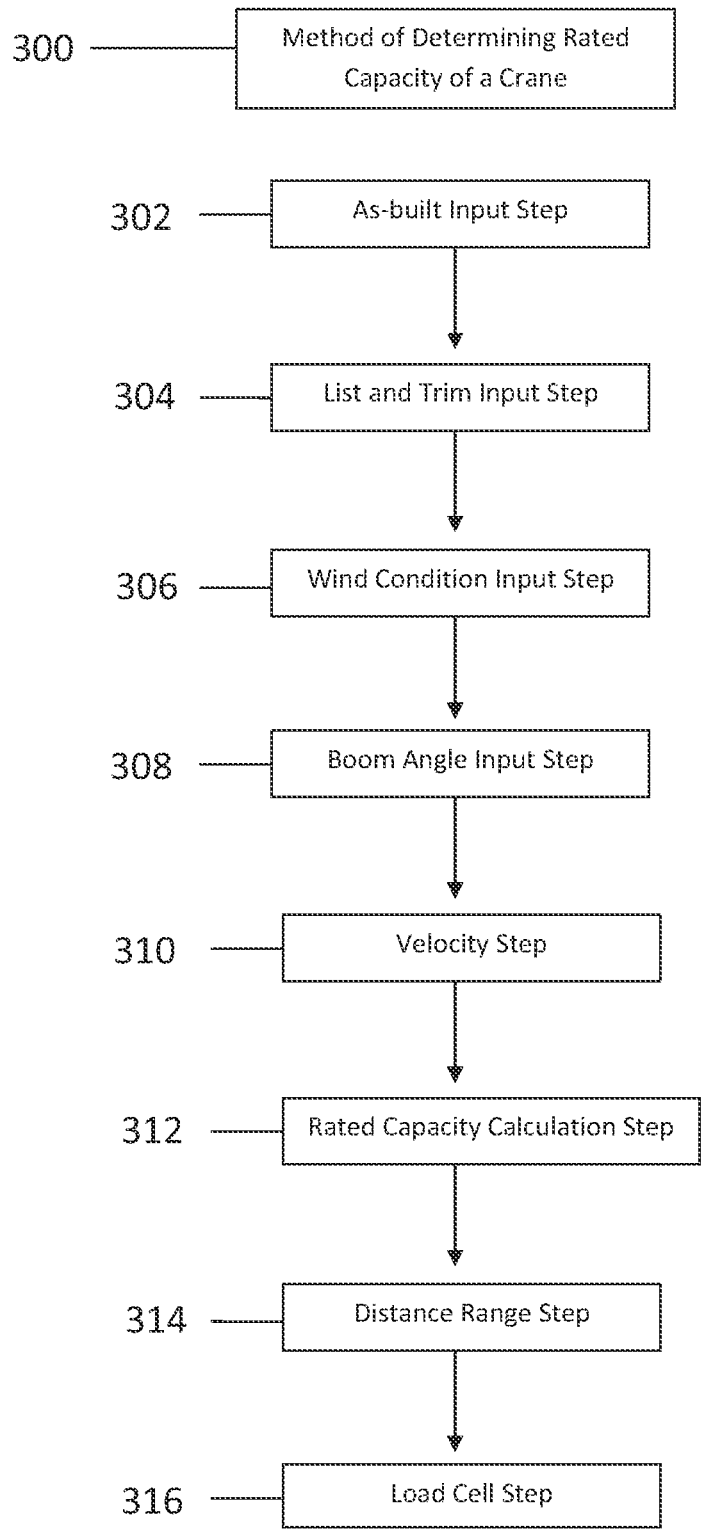
FIG. 7 depicts a method of determination of rated capacity of the present invention.

Referring to FIG. 7, an exemplary method 300 of determining rated capacity of a crane under then-current environmental conditions comprises the following steps:

As-built Input Step 302 comprises input of as-built crane parameters and calculation parameters necessary to determine safe working limits of the subject crane 10 as part of software 200 thereby enabling calculation of crane safe working limits with data processor 44.

List and Trim Input Step 304 comprises a step of sensing and transmitting to data processor 44 current crane 10 list and trim data.

Wind Condition Input Step 306 comprises a step of sensing and transmitting to data processor 44 current wind condition trim data.

Boom Angle Input Step 308 comprises a step of sensing and transmitting to data processor 44 current boom angle status.

Velocity Step 310 comprises determination of relative velocity of boom tip 14 in relation to target load 24 in accordance with the system and method previously described herein and consistent with Steps 210, 220, 222 and 224 of FIG. 5.

Rated Capacity Calculation Step 312 comprises calculation of rated capacity of crane 10 based on as-built crane parameters, crane list and trim, environmental wind conditions, boom angle and relative velocity of movement of boom tip 14 in relation to target load 24.

Steps 302, 304, 306, 308 and 310 may occur in any order prior to Step 312.

An exemplary embodiment further includes a Distance Range Step 314 comprising a step of determination of a distance range of boom tip 14 in relation to target load 24 in accordance with the system and method previously described herein and consistent with Steps 210, 212, 214 and 216 of FIG. 4. Distance Range Step 314 may occur prior to Step 312.

An exemplary embodiment further includes a Load Cell Step 316 comprising a step of determining actual load on crane hook 15 in relation to then-determined crane 10 rating capacity. Load Cell Step 316 may be ordered at any time before or after Step 312.

All embodiments described herein contemplate continuous and/or intermittent applications of the method steps herein described to allow regular iterations of the processes and methods herein described.

On a continuous or intermittent basis, determinations made may be output to an operator interface device 40, to an internal storage device (not shown) and/or an external recording device 46 with appropriate time and date indicia to provide a record of activity.

The foregoing description of the invention illustrates a preferred embodiment thereof together with various alternative embodiments. Various changes may be made in the details of the illustrated construction and methods within the scope of the appended claims without departing from the true spirit of the invention. The present invention should only be limited by the claims and their equivalents.

We claim:

1. A system for determining crane load capacity of an offshore crane, the system comprising:
   a rangefinder mounted on a crane boom proximate a crane boom tip;
   said rangefinder having a signal transmitter and a signal receiver; and
   said rangefinder including a signal processor;
   wherein:
   said rangefinder directs a signal downward;
   said rangefinder receives a refracted said signal from a refractive surface proximate a target load; and
   said rangefinder determines vertical distance measurements of said boom tip to said refractive surface based on said refracted signal; and
   a data processor disposed on said crane and operably connected to said signal processor;
   wherein:
   said system utilizes said vertical distance measurements to determine velocity measurements of relative movement of said refractive surface in relation to said boom tip; and said system calculates a load capacity of said crane utilizing said velocity measurements of relative movement.

2. A system according to claim 1 wherein:
said data processor is programmed to filter outlier velocity measurements.

3. A system according to claim 1 wherein:
said data processor is programmed to filter outlier distance measurements.

4. A system according to claim 1 wherein:
said system is adapted and configured to calculate said load capacity of said crane based at least in part on then-current environmental conditions.

5. A system according to claim 1 wherein:
said system to calculates said load capacity of said crane based at least in part on as-built crane parameters.

6. A system according to claim 1 comprising at least one then-current environmental conditions sensor selected from the group consisting of:
1. a list and trim sensor;
2. a wind condition sensor; and
3. a boom angle sensor.

7. A method of determining rated capacity of a crane by determining relative movement of a target load in relation to a crane boom tip utilizing a rangefinder mounted proximate the boom tip, said method comprising:
a data gathering step of transmitting a signal downward from said rangefinder to a surface proximate said target load, sensing a refracted signal, and determining multiple distance measurements;
a distance averaging step of determining average distance measurements during specified time intervals and transmitting said average distance measurements to a data processor;
a velocity calculation step of said data processor processing said average distance measurements to calculate relative vertical velocity measurements; and
a crane rated capacity determination step of utilizing said relative vertical velocity measurements to determine an applicable crane rated capacity.

8. A method according to claim 7 comprising:
a filtering step of filtering outlier distance measurements from said average distance measurements.

9. A method according to claim 7 comprising:
a filtering step of filtering outlier velocity measurements from said relative vertical velocity measurements.

10. A method according to claim 7 comprising:
utilizing historical load chart information to determine said applicable crane rated capacity.

11. A method of determining rated capacity of a crane under then-current environmental conditions comprising:
an access step of accessing as-built crane parameters from a data processor on said crane;
at least one step selected from the group consisting of:
1. a list and trim input step of sensing and transmitting to said data processor current crane list and trim data;
2. a wind condition input step of sensing and transmitting to said data processor current wind condition data; and
3. a boom angle input step of sensing and transmitting to said data processor current boom angle status;
a velocity step of determining and transmitting to said data processor relative velocity data of movement of a target load in relation to a boom tip of said crane utilizing a rangefinder mounted proximate said boom tip, wherein said rangefinder utilizes a signal transmitter and a signal receiver to determine distance between said target load and said boom tip to determine said relative velocity data; and
a rated capacity calculation step of using:
said as-built crane parameters;
at least one set of data selected from the group consisting of:
1. said current crane list and trim data;
2. said current wind condition data; and
3. said current boom angle status; and
said relative velocity data, to produce a calculated rated capacity of said crane.

12. A method according to claim 11 comprising:
a distance range step of determining distance range data of said boom tip in relation to said target load utilizing said rangefinder.

13. A method according to claim 11 comprising:
a load cell step of determining actual load on a crane hook of said crane in relation to said calculated rated capacity of said crane.

14. A method according to claim 11 comprising:
an as-built input step of programming as-built crane parameters and calculation parameters into software of said data processor.

\* \* \* \* \*